United States Patent [19]
Collins

[11] 3,775,009
[45] Nov. 27, 1973

[54] PHOTOCOPIER EXPOSURE CONTROL

[75] Inventor: John E. Collins, North Hudson, Wis.

[73] Assignee: Minnesota Mining and Manufacturing Company, St. Paul, Minn.

[22] Filed: Aug. 23, 1972

[21] Appl. No.: 282,973

[52] U.S. Cl. ............... 355/83, 240/1 EL, 350/96 R, 355/1, 355/68
[51] Int. Cl. ........................................... G03b 27/78
[58] Field of Search .................... 355/83, 68, 69, 1; 350/96 R, 96 B

[56] References Cited
UNITED STATES PATENTS

| | | | |
|---|---|---|---|
| 2,572,930 | 10/1951 | Heldens | 355/83 |
| 3,642,377 | 2/1972 | Young | 355/83 |
| 3,559,555 | 2/1971 | Street | 350/96 B |
| 3,554,109 | 1/1971 | Street | 350/96 B |

*Primary Examiner*—Richard L. Moses
*Attorney*—Kinney, Alexander, Sell, Steldt & Delahunt

[57] ABSTRACT

An automatic exposure control for a reflex photocopier wherein a light-transmissive photosensitive film is moved through an exposure area in intimate contact with an original document to differentially desensitize the photosensitive film according to the differential reflectivity of the original document. The exposure control continuously collects a plurality of samples of light representative of the sum of the intensity of the light from the exposure light source and the intensity of the light reflected from the portion of the original document at the exposure area, each sample representing the sum over a portion of the exposure area. The samples of light are simultaneously transmitted, their intensities are averaged and the output from the exposure light source is controlled in response to the average intensity to maintain the intensity of the light which exposes the photosensitive film a predetermined constant.

9 Claims, 3 Drawing Figures

PATENTED NOV 27 1973 3,775,009

3,775,009

PHOTOCOPIER EXPOSURE CONTROL

FIELD OF THE INVENTION

The present invention relates to an automatic exposure control for a reflex photocopier to provide proper desensitization of a photosensitive film with original documents having varying image and non-image areas.

BACKGROUND OF THE INVENTION

A reflex photocopier generally includes a light source, a diffuse reflector, and means for positioning an original document to be copied and a light-transmissive photosensitive film in intimate contact therewith. The photosensitive film-original document composite may be stationarily positioned during exposure at an exposure area having dimensions at least as great as the composite or the composite may be moved through a relatively short but wide exposure area. In the reflex position the photosensitive film lies between the printed surface of the original document and the light source. The light passes through the photosensitive film, being absorbed at the black or colored imaged areas and reflected at the less absorptive white background areas. Some of the energy is also absorbed within the photosensitive film causing desensitization of the reactive coating. The degree of desensitization is proportional to the product of the desensitizing light intensity and the exposure time. The exposure is continued for a time just sufficient to completely desensitize the doubly exposed film above the background areas, the film over the imaged areas thus retaining a degree of sensitivity or reactivity. Following the exposure and dependent upon the type of photosensitive film utilized, the film is heated to develop the images thereon or it is placed against a coated receptor sheet and the composite is heated to produce the images on the receptor sheet.

The reflex exposure cycle must be carefully controlled to completely desensitize the areas of the photosensitive film over the background areas of the original document while retaining a degree of sensitivity or reactivity in the areas thereof over the imaged areas of the original document. Different production runs of the photosensitive film may produce variances in the photosensitivity of the film. This problem has been realized in the prior art and manual exposure control settings have been provided on reflex photocopiers to control the duration of an exposure cycle to adjust for these variances.

Very recently it has been found that during reflex exposure, light directed against and then reflected from an original document being copied is again reflected from the diffuse reflector onto the photosensitive film and that the intensity of this reflected light is sufficiently great to vary, according to the reflectivity of the original document, the time required to totally desensitize the photosensitive film over background areas of the original document. United States application Ser. No. 166,607 filed on July 27, 1971, and assigned to the assignee of this application, discloses an apparatus and method for compensating for this variation. That application discloses a reflex photocopier in which the photosensitive film-original document composite is stationarily positioned during an exposure cycle. A sample of light is collected which is representative of the sum of the intensity of the light from the source and the intensity of light reflected from the original document. The exposure cycle is controlled to maintain the integral of the intensity of the light sample as a function of exposure time constant over successive exposure cycles, which constant equals a predetermined value representing total desensitization of the areas of the photosensitive film over background areas of the original document.

SUMMARY OF THE INVENTION

It has now been found that in reflex photocopiers wherein the photosensitive film-original document composite progresses through a relatively short but wide exposure area during the exposure cycle, the average of a plurality of samples of light representative of the intensity of the light from the source and the intensity of the light reflected from the original document, each sample representing the sum over a portion of the exposure area, more adequately determines the light intensity level for proper desensitization of the portion of the photosensitive film in the exposure area. Further, it has been found that more effective control of the degree of desensitization is obtained by continuously controlling the output from the light source with respect to a short exposure area since the degree of desensitization is varied with respect to the reflectivity of only a short segment of the original document and the overall effect is to carefully control the exposure cycle with respect to a continuously changing short segment thereby providing a better average desensitization of the photosensitive film.

According to the present invention an automatic exposure control is provided in combination with a reflex photocopier wherein the photosensitive film-original document composite is moved through a predetermined exposure area at a constant velocity. The exposure control comprises means for collecting at a plurality of predetermined spaced positions continuously during the exposure cycle samples of light representative of the sum of the intensity of the light from the source and the intensity of the light reflected from the original document at the exposure area, each of the samples representing said sum over a portion of the exposure area; means for averaging the intensities of the samples of light; means for simultaneously transmitting samples of light from the means for collecting to the means for averaging; and means responsive to the means for averaging for controlling the output from the light source to maintain the sum of the intensity of the light from the source from the intensity of the light reflected from the original document at the exposure area a predetermined constant.

THE DRAWING

Figure 1:
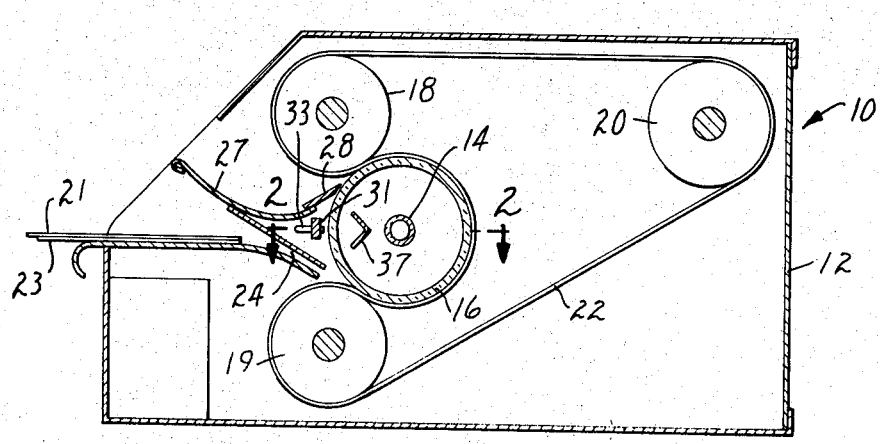
FIG. 1 is a side elevation view of a photocopier embodying the automatic exposure control of the present invention and having the side frame thereof removed.
Figure 2:
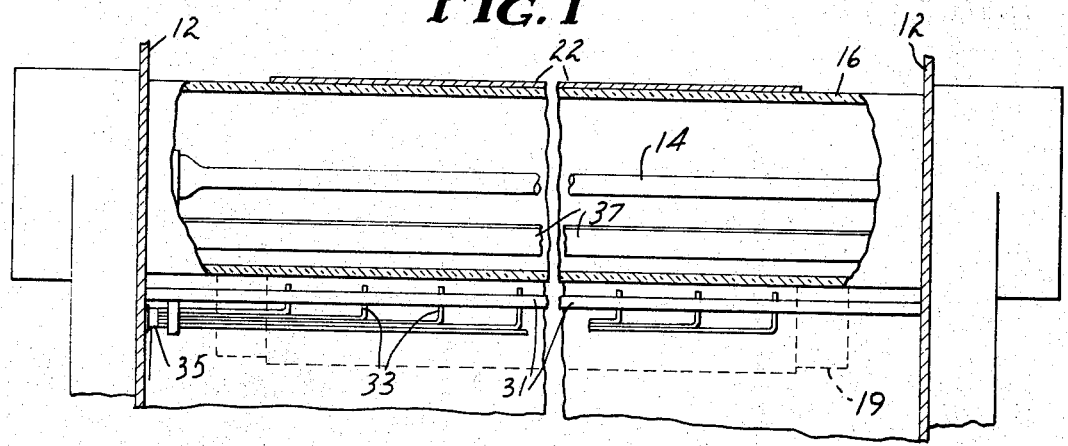
FIG. 2 is a cross-sectional view taken generally along line 2—2 of FIG. 1.

The photocopier, generally designated 10, includes a support frame 12, an elongate tubular exposure lamp 14 supported by the frame 12, and a glass cylinder 16 supported by the frame 12 coaxially with the lamp 14 for free rotation about its axis. The glass cylinder 16 is internally frosted with a white paint to make it translucent so that it will diffuse light from the lamp 14 as the light passes through the cylinder wall.

Three guide rollers 18, 19 and 20 are supported by the frame 12 for free rotation about axes parallel to the axis of the exposure cylinder 16 to define a drive belt guide path having an angle of wrap around the exposure cylinder 16 of approximately 240°. An endless drive belt 22 extends along the belt guide path around the exposure cylinder 16. A constant speed motor (not shown) drives guide roller 20 clockwise as viewed in FIG. 1 to provide constant speed drive of the drive belt 22 thereby with the cylinder 16 and the drive belt 22 to provide means for moving a light-transmissive photosensitive sheet 21 and an original document 23 in intimate contact therewith through a predetermined exposure area around the lamp 14 at a constant velocity.

The photocopier frame 12 is formed with an opening in the front thereof leading into an entrance chute 24 for guiding a light-transmissive photosensitive sheet and an original document in intimate contact therewith into the initial contact between the exposure cylinder 16 and the drive belt 22. And, an exit ramp 27 defines a guide path for the photosensitive sheet-original document combination from the departing contact of the exposure cylinder 16 and the drive belt 22 to the opening in the front of the machine. A skiving knife 28 is supported by the exit ramp 27 to skive a photosensitive sheet-original document combination off the exposure cylinder 16 and onto the exit ramp 27.

A fiber optic bundle support bar 31 is supported by the frame 12 to extend parallel to the axis of the exposure cylinder 16 in the area between the entrance chute 24 and the exit ramp 27. A plurality of fiber optic bundles 33 pass through apertures in the support bar 31 at equally spaced intervals along the axis of the exposure cylinder 16 to position one end of each of the fiber optic bundles 33 adjacent the exposure cylinder 16. The fiber optic bundles 33 are spaced axially along the cylinder 16 a distance generally corresponding to the width of the light-transmissive photosensitive sheet to be used, with the terminal fiber optic bundles being spaced slightly inwardly of the edges of the photosensitive sheet. The opposite ends of the fiber optic bundles 33 are brought together at a single photocell 35 so that each bundle provides a portion of the light received by the photocell 35. The photocell 35 sums the intensities of the light collected by the fiber optic bundles 33 and, therefore, it provides a means for averaging the intensities of the light at the locations at which the fiber optic bundles 33 collect exposure light.

An angle bar 37 is supported by the frame 12 within the exposure cylinder 16 parallel to the lamp 14 along the entire length thereof and between the lamp 14 and the ends of the fiber optic bundles 33 adjacent the cylinder 16 to shield the fiber optic bundles 33 from direct light from the lamp 14. Thus, the fiber optic bundles 33 collect only a light from the lamp 14 which has at least been once reflected.

The light diffusing property of the cylinder 16 causes uniform diffusion of the light from the lamp 14 and thereby in effect acts as a diffuse reflector for reflecting light during an exposure cycle from the lamp 14 uniformly onto a predetermined exposure area at the periphery of the exposure cylinder 16 extending counterclockwise as viewed in FIG. 1 from tne entrance chute 24 to the skiving knife 28. The fiber optic bundles 33 collect light reflected from the internal surface of the cylinder 16 and light reflected from the background areas of an original document 23 moved between the exposure cylinder 16 and the drive belt 22 in intimate contact with a light-transmissive photosensitive sheet 21, the photosensitive film lying between the original document and the lamp 14. Each fiber optic bundle is sensitive to the intensity of the light across a small width of the original document and, thereby, the sum of the intensities collected by the fiber optic bundles 33 provides an average across the width of the original document 23 of the sum of the intensity of the light reflected from the interior of the cylinder and the intensity of the light reflected from the portion of the original document in the exposure area.

Figure 3:
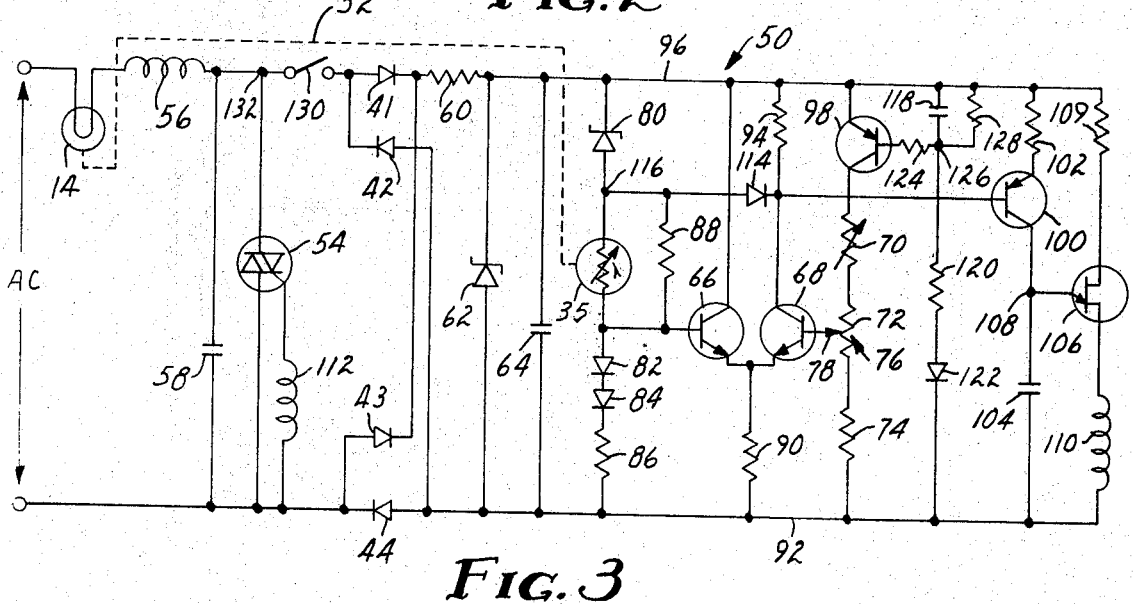
FIG. 3 is a schematic circuit diagram of the control circuit of the automatic exposure control of the present invention.

The control circuit generally designated 50, shown in FIG. 3, serves to vary the light output from the lamp 14 to cause the reflected light detected by the fiber optic bundles 33 to remain at a predetermined constant level. The light collected by the plurality of fiber optic bundles 33, which is reflected from the inside of the exposure cylinder 16 and the document being copied, is piped by the fiber optic bundles to the photocell 35. These optical paths are indicated in FIG. 3 by the single dotted line 52. With this arrangement, the resistance of the photocell 35 is a measure of the total reflected light energy detected by the fiber optic bundles 33 at any instant of time.

The resistivity of the photocell 35 is used in the circuitry of FIG. 3 to develop a signal for controlling the conduction of a controlled bidirectional semiconductor switching device 54 connected in series with the lamp 14 across an AC power source. An inductor 56, which merely serves to suppress any radio frequency signals that may be developed by the on-off operation of the switching device 54, is also connected in series with the device 54 and lamp 14. In the embodiment shown, the device 54 is a triac. The circuit is arranged to decrease the time that the triac 54 conducts during each cycle of AC power when the light energy detected by the photocell 35 increases above a desired level and to increase the conducting time when the light energy detected drops below a desired level.

A capacitor 58 is shown connected across the triac 54 which serves to delay the application of full voltage to the triac 54. If capacitor 54 were not used, it might be possible for the triac 54 to be turned on when the AC power is initially applied to the circuit.

The circuitry shown to the right of triac 54 develops the triggering signal for the triac. The triggering signal circuit is connected across the triac 54 and includes a power supply portion. The power supply portion includes diodes 41–44 arranged in conventional fashion to provide full wave rectification of the AC power presented across the triac 54. When conducting, the triac 54 presents a virtual short across the triggering signal circuitry, so the power supply portion of the triggering signal circuitry will only supply a DC voltage when the triac 54 is not conducting. A DC triggering pulse can be provided for each half cycle of the AC power so the triac 54 can conduct for at least a portion of each half cycle of the AC power.

The DC power supply portion of the circuitry also includes the resistor 60 and Zener diode 62. In one embodiment the Zener diode 62 and resistor 60 were selected to provide 10 volts DC across the Zener diode 62. A small capacitor 64, which merely serves to eliminate any high frequency signals that may be present, is connected across the Zener diode 62.

In order that variations in the conductivity or resistivity of the photocell 35 can be used for control of the light intensity at a selected constant level, it is necessary that such variations be related to some selectable reference or set point. In the embodiment shown, this is accomplished by connecting the photocell 35 as a part of a differential amplifier which includes the two NPN type transistors 66 and 68. The photocell 35 is connected in the base electrode circuitry for the transistor 66. Changes in the resistivity of the photocell 35 alter the base current of the transistor 66 and therefore the conduction of transistor 66. The base current of the transistor 68 is determined primarily by the series connected resistors 70, 72 and 74. The resistor 72 is the resistive portion of a potentiometer 76 which has its wiper or movable contact 78 connected to the base electrode of transistor 68. The potentiometer 76 thus provides the means for selecting the set point or reference voltage for the differential amplifier and therefore the light level to be maintained. The output of the differential amplifier is obtained at the collector of transistor 68. This output varies in accordance with the difference between the base current of transistor 68 and the base current of transistor 66. Since the setting of potentiometer 76 establishes the average light level that is to be maintained for the photographic or copying process, it is placed in a position where it can be adjusted by the operator.

The base electrode circuitry for transistor 66 includes the series circuit comprising a Zener diode 80, photocell 35, diodes 82 and 84 and a resistor 86. The diodes 82 and 84 are used to provide temperature compensation for the photocell 35. This series circuit is connected across the Zener diode 62. The base electrode of transistor 66 is connected to the connection common to the photocell 35 and diode 82. The circuitry for the base of transistor 66 also includes a resistor 88 connected in parallel with the photocell 35. The resistor 88 will provide some base current to transistor 66 when the resistance of photocell 35 is initially very high prior to the lamp 14 being turned on. The emitter electrodes of transistors 66 and 68 are each connected to a resistor 90 which connects to a conductor 92. The conductor 92 is a common conductor which connects to the anode side of Zener diode 62, one side of capacitor 64, an end of resistor 86, and with the anodes of diodes 42 and 44. The collector electrode of transistor 68 is connected by a resistor 94 and the common conductor 96 to the cathode side Zener diode 62. The collector electrode of transistor 66 is also connected to the conductor 96. Resistor 74 of the series connected resistors 70, 72 and 74 is connected to the conductor 92 while resistor 70 is connected to the conductor 96 via the collector and emitter electrodes of a transistor 98. The transistor 98 is a PNP type transistor so the emitter electrode is connected to the common conductor 96 which is positive with respect to the conductor 92. The resistor 70 is shown to be variable and is used to compensate for tolerances in the other components determining the base current of transistor 68.

The output of the differential amplifier, which reflects the changes in the level of light energy applied to the photocell 35, is applied to an NPN transistor 100 which has its base electrode connected to the collector of transistor 68 of the differential amplifier. The emitter of transistor 100 is connected to the common conductor 96 via a resistor 102 while its collector electrode is connected to one side of a capacitor 104. The other side of capacitor 104 is connected to the common conductor 92.

The emitter electrode of a unijunction transistor 106 is connected to the connection 108 common to the collector electrode of transistor 100 and capacitor 104. The base-one electrode of the unijunction transistor 106 is connected to the common conductor 96 via a resistor 109 while the base-two electrode is connected to the common conductor 92 via the primary winding 110 of a pulse transformer. The secondary winding 112 of the pulse transformer is connected between the gate electrode of triac 54 and one side of the AC power supply.

Transistor 100 serves as a current source, which when conducting, causes capacitor 104 to be charged to a voltage level sufficient to fire the unijunction transistor 106. Conduction of transistor 106 causes the capacitor 104 to be rapidly discharged via the primary winding 110 of a pulse transformer inducing a pulse at the secondary winding 112 connected to the gate electrode of the triac 54 causing the triac to be turned on.

In order to make certain that the voltage on capacitor 104 will always reach a value sufficient to fire the unijunction transistor 106, the base electrode of transistor 100 is connected via a diode 114 to the connection 116 that is common to the photocell 35 and Zener diode 80. With this arrangement the voltage at base of the transistor 100 will always be at least approximately equal to the voltage provided by the Zener diode 80. The Zener diode 80 is therefore selected to provide a voltage which is greater than the voltage needed to trigger the unijunction transistor 106.

The transistor 98 connected to the differential amplifier permits conduction of transistor 68 of the differential amplifier to gradually increase for several cycles of the AC power when the circuit is initially energized so that full power is not immediately applied to the lamp 14. This serves to extend the life of the lamp 14. Conduction of transistor 68 increases during a time delay of approximately 300 milliseconds provided by the RC circuit connected to transistor 98 which includes capacitor 118 and resistor 120. The RC circuit allows the voltage at the base of transistor 98 needed for conduction to increase gradually. The capacitor 118 is connected in series with resistor 120 and has one side connected to the common conductor 96. The resistor 120 is connected to the common conductor 92 via a diode 122. The base electrode of transistor 98 is connected via resistor 124 to the connection 126 that is common to capacitor 118 and resistor 120. A discharge path for the capacitor 118 is provided by a resistor 128 connected in parallel with capacitor 118.

In use, the constant speed belt drive motor (not shown) is energized to move the drive belt 22 at constant speed and the circuitry shown in FIG. 3 is placed in operation by closure of the switch 130 which connects the rectifying diodes 41 and 42 to the connection 132 common to triac 54 and inductor 56. Until the switch 130 is closed, a triggering signal cannot be produced and applied to the triac 54 to cause triac 54 to conduct to energize the lamp 14. Since the lamp 14 is initially not energized, the resistance presented by the photocell 35 is high. This being the case, conduction of transistor 68 upon closure of switch 130 will increase gradually during the 300 millisecond time delay introduced by transistor 98 and its associated circuitry. Since the resistance presented by the photocell 35 is initially high, conduction of the transistor 68 will reach a level sufficient to reduce the voltage at the collector of transistor 68 to the level provided by the Zener diode 80 and diode 114 causing the transistor 100 to conduct at a high level to quickly charge capacitor 104. Capacitor 104 will charge to a voltage sufficient to fire unijunction transistor 106 causing the capacitor 104 to be discharged via the primary winding 110 of the pulse transformer to produce a triggering signal at the secondary winding 112 connected to the gate of triac 54. As the level of conduction of transistor 68 increases, the time for charging capacitor 104 decreases so the portion of each cycle when the triac 54 conducts is gradually increased over a number of cycles of the AC power due to the time delay provided by transistor 98 and its associated circuitry. About one second is required to discharge capacitor 118 so no further delay is presented to the differential amplifier circuit by the transistor 98 circuitry following the initial operation of the circuitry.

Since the DC power supply circuitry for the triggering circuit provides full wave rectification of the AC power, a pulse of DC voltage is presented to the triggering circuit for each half cycle of the AC power causing the triggering circuit to provide a triggering signal to fire the triac 54 for each half cycle.

Exposure of a photosensitive sheet 21 is initiated by placing it in intimate contact with an original document 23 and sliding the combination down the entrance chute 24 with the original document on the bottom. The leading edge of the combination enters between the drive belt 22 and the exposure cylinder 16 and the combination is pulled through the exposure area around the lamp 14 until it passes over the skiving knife 28 and out of the exit ramp 27.

As the photosensitive film-original document combination progresses through the exposure area the firing of the triac 54 continues and the photocell 35 receives the light energy detected by the fiber optic bundles 33. Light received by the photocell 35 causes the resistance of the photocell to drop from its initial high value and to vary in accordance with the light energy received via the fiber optics bundles represented in FIG. 3 by the dotted line 52. Once the light 14 is energized, the voltage at the collector of transistor 68 will rise above the minimum level provided by the Zener diode 80 and diode 114. Since voltage at the collector of transistor 68 is then determined by the setting of the potentiometer 76 and the resistivity of the photocell 35, the unijunction transistor 106 will fire at the same point during each half wave of the AC power so long as the light energy received by the photocell 35 remains constant. Should the conductivity of the photocell 35 increase due to an increase in the light energy received, transistor 66 will conduct more causing transistor 68 to conduct less. A reduction in the collector current of transistor 68 causes the voltage at the collector of transistor 68 to increase to reduce the level of conduction for transistor 100. A reduction in the conduction of transistor 100 increases the time required for capacitor 104 to charge to a level sufficient to fire the unijunction transistor 106. A triggering signal will thus be provided the triac 54 at a point later in the half cycle of the AC power then being presented causing a reduction in the current flow through the lamp 14 to thus reduce the light energy level. A reduction in the light energy level detected by the fiber optic bundles 33 which is applied to the photocell 35 will cause the conductivity of the photocell 35 to decrease which in turn causes a reduction in the current flow through transistor 66 causing the transistor 68 to conduct at a higher level to reduce the voltage at the collector of transistor 68. This causes the transistor 100 to conduct at a higher level causing the capacitor 104 to charge more rapidly to a level sufficient to fire the unijunction transistor 106. A triggering signal is thus presented to increase the current flow through the lamp 14 and increase the light energy level. In this manner, the light output of lamp 14 is controlled so the light energy level detected by the fiber optic bundles 33 and transmitted to the photocell 35 in accordance with the selected setting of the potentiometer 76 will be maintained constant.

When the entire length of the photosensitive sheet-original document combination has progressed through the exposure area it is removed from the exit ramp 27. Depending upon the type of photosensitive film being used, the photosensitive sheet is then heated alone to develop the images thereon or it is placed in contact with a coated receptor sheet and the composite is heated to produce the images on the receptor sheet.

A specific example of a control circuit 50 can be constructed as shown in FIG. 3 using transistors having at least a 25 volt breakdown rating with a beta of 80 or more and a photocell rated at 308Ω and 2 foot candles. The triac 54 can be any having a rating of at least 25 Amperes, 220 volts. Typical values or types for other components shown in FIG. 3 are listed below:

| | |
|---|---|
| Lamp | 90 V, 1000 W |
| Zener Diode 62 | 10 V |
| Zener Diode 80 | 4.7 V |
| Diodes 41-44 | Type 1N4003 |
| Other Diodes | Type 1N4148 |
| Inductor 56 | 33 μh |
| Potentiometer 76 | 10 KΩ |
| Capacitors | |
| 58 | 0.047 μf |
| 64 | 220 pf |
| 104 | 0.22 μf |
| 118 | 10 μf |
| Resistors | |
| 60 | 10 KΩ |
| 70, 74, 90 | 20 KΩ |
| 86 | 4.7 KΩ |
| 88 | 22 KΩ |
| 94 | 100 KΩ |
| 102 | 7.5 KΩ |
| 109 | 2.7 KΩ |
| 120 | 11 KΩ |
| 124 | 470 KΩ |
| 128 | 200 KΩ |

I claim:

1. In a photocopier including a light source, a diffuser reflector for reflecting light during an exposure cycle from the source uniformly onto a predetermined exposure area and means for moving a light-transmissive photosensitive film and an original document in intimate contact therewith through the predetermined exposure area at a constant velocity, the original document having image and non-image areas providing a differential reflectivity, the photosensitive film being between the source of exposure light and the original document and the photosensitive film being differentially desensitized according to the differential reflectivity of the original document, an automatic exposure control comprising:

means for collecting at a plurality of predetermined spaced positions continuously during the exposure cycle samples of light representative of the sum of the intensity of the light from the source and the intensity of the light reflected from the original document at the exposure area, each said sample representing said sum over a portion of the exposure area, means for averaging the intensities of a said plurality of samples of light, means for simultaneously transmitting samples of light from said means for collecting to said means for averaging, and means responsive to said means for averaging for controlling the output from the light source to maintain the sum of the intensity of the light from the source and the intensity of the light reflected from the original document a predetermined constant at the exposure area, said means for controlling including a semi-conductor switching device connected in series with the light source and a signal triggering circuit for said device, said triggering circuit being connected to said means for averaging for control thereby.

2. The photocopier of claim 1 wherein said means for collecting and said means for transmitting comprise a plurality of fiber optic bundles, each said fiber optic bundle having one end at one of said predetermined spaced positions and its opposite end connected to said means for averaging.

3. The photocopier of claim 2 wherein said means for averaging comprises a single photocell positioned to receive the plurality of samples of light collected and transmitted by said fiber optic bundles.

4. The photocopier of claim 1 wherein said means for controlling the light source includes a semi-conductor switching device connected in series with the light source and a signal triggering circuit for said device, said triggering circuit connected to said means for averaging for control thereby.

5. The photocopier of claim 1 wherein said signal triggering circuit includes a pulse producing circuit portion for applying a triggering pulse to said semi-conductor switching device, a differential amplifier connected to said means for averaging and said pulse producing circuit for controlling said pulse producing circuit in accordance with said means for averaging.

6. The photocopier of claim 5 wherein said signal triggering circuit includes means connected to said differential amplifier for determining the set point for said signal triggering circuit.

7. The photocopier of claim 5 wherein said signal triggering circuit includes means limiting the operation of said differential amplifier when said signal triggering circuit is initially energized.

8. The photocopier of claim 5 wherein said pulse producing circuit includes a pulse transformer coupled to said semi-conductor switching device and a capacitor controlled unijunction transistor connected to said pulse transformer.

9. The photocopier of claim 1 wherein the photocopier is an a.c. operated copier, said semi-conductor switching device is connected in series with the light source for energization by an a.c. power source and said signal triggering circuit provides a triggering signal for said device during each half cycle of the a.c. power source.

* * * * *